United States Patent [19]

Sperandio et al.

[11] 3,928,077
[45] Dec. 23, 1975

[54] CASING FOR AN ELECTROCHEMICAL CELL HAVING SMALL BULK

[75] Inventors: Francis Sperandio, Le Bouscat; Michel Guglieri, Bassens, both of France

[73] Assignee: Saft-Societe des Accumulateurs Fixes et de Traction, Fomainville, France

[22] Filed: Sept. 5, 1974

[21] Appl. No.: 503,253

[30] Foreign Application Priority Data
July 12, 1974 France .................. 74.24355

[52] U.S. Cl. .................................. 136/111
[51] Int. Cl.² ............................... H01M 21/00
[58] Field of Search .......... 136/111, 107, 133, 166, 136/134, 135

[56] References Cited
UNITED STATES PATENTS

| | | |
|---|---|---|
| 2,499,239 | 2/1950 | Williams, Jr. ................ 136/111 |
| 2,576,266 | 11/1951 | Ruben .......................... 136/111 |
| 3,278,339 | 10/1966 | Reilly et al. ................ 136/133 X |
| 3,524,770 | 8/1970 | Wilke .......................... 136/133 |
| 3,556,848 | 1/1971 | Ruetschi ...................... 136/133 X |

*Primary Examiner*—Anthony Skapars
*Attorney, Agent, or Firm*—Kenyon & Kenyon Reilly Carr & Chapin

[57] ABSTRACT

The invention concerns an electrochemical cell provided with a casing which comprises a metallic sheet, one portion of which is partly in contact with an electrode of one polarity. Such a cell is characterized more particularly in that the portion of the sheet in contact with the electrode is offset inwardly towards the inside of the generator in relation to the remainder of the said portion. The invention is applicable to electrochemical cells having small bulk in at least one dimension.

2 Claims, 4 Drawing Figures

U.S. Patent   Dec. 23, 1975   3,928,077
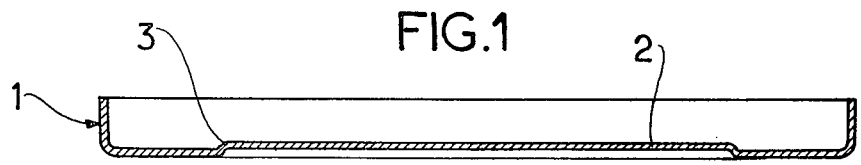
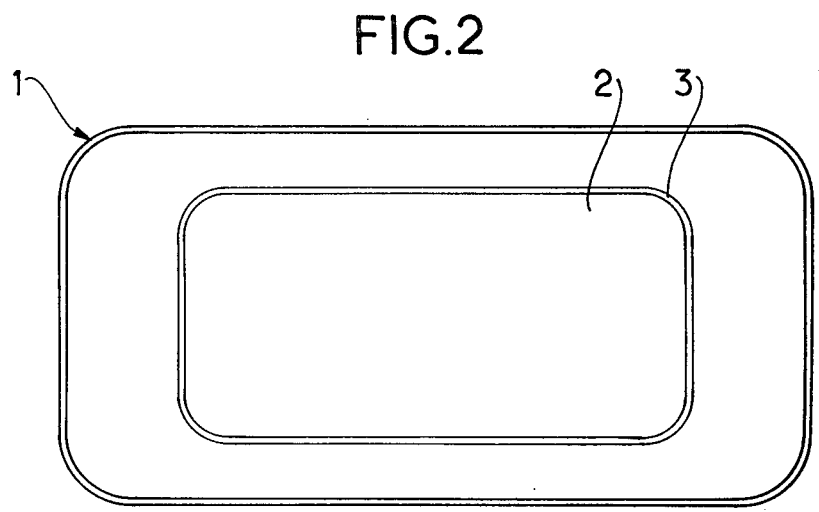
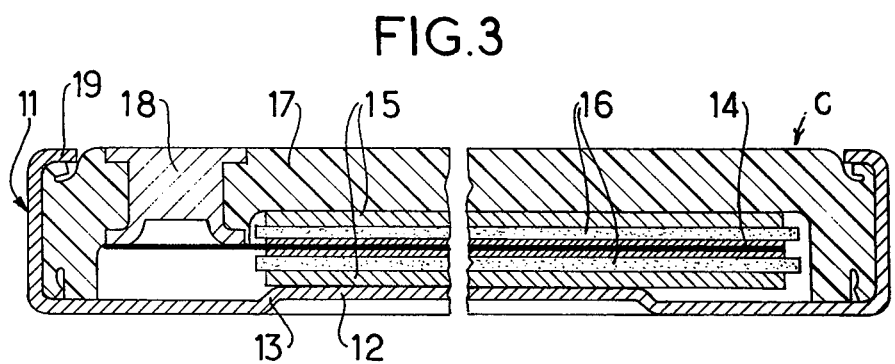
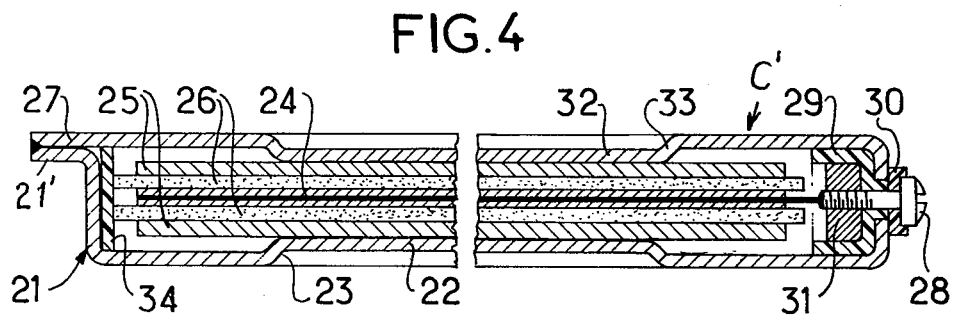

CASING FOR AN ELECTROCHEMICAL CELL HAVING SMALL BULK

RELATED APPLICATION

A related application entitled Self-Tightening Sealing Arrangement For An Enclosure Such As A Casing for an Electrochemical Cell by the same inventors Ser. No. 503,260 filed Sept. 5, 1974 is co-pending.

BRIEF SUMMARY OF INVENTION

The present invention relates to casings for electrochemical cells having a small bulk, at least in one dimension.

Present electrochemical cells of the rechargeable or non-rechargeable type, must frequently be used as a source of power in devices in which the volume which is available for them is very small. It is then essential for their overall dimensions, in all the circumstances of their operation, not to exceed prescribed limits, without any reduction in their capacity.

In such cells, where, for example, the height must be very small, one of the first measures to be taken is the elimination of, as far as possible, or the reduction to the strict minimum of the special connections between electrodes and current output terminals. In general, one of the solutions adopted is the utilizing as the current outputs of the cell portions of the casing which are in electrical contact with respective of the electrodes. To maintain this contact between the electrodes and the requisite casing portions throughout the whole operation and during all circumstances (for example, in the case where an internal overpressure makes the casing swell), the welding of a portion of the electrode to the portion of the casing which acts as the corresponding terminal may be effected. However, the disadvantages of welding are firstly, the necessity of effecting welding on a portion of the electrode that is free of active material. This portion is therefore lost in respect to the capacity of the cell. Moreover, a difficulty sometimes occurs in obtaining a reliable weld since the welding operation must often be effected after the assembly of the cell has been completed, that is, with the electrodes of the cell already installed within the cell casing, thus making the application of the welding electrodes difficult.

The insertion of a spring between a casing wall and the requisite cell electrodes has also been considered for maintaining constantly a good contact between such electrodes and such portion of the casing, even when the walls of the casing tend to swell under the influence of an internal pressure. Such an arrangement is described in U.S. Pat. No. 2,971,999. But besides the disadvantage of requiring an extra part for the assembly of the cell, the use of the spring gives a satisfactory result only with electrodes having a relatively small surface. Then, however, the bulk of the spring is no longer negligible.

An aim of the present invention is to overcome these disadvantages.

It has among its objects and features an electrochemical cell provided with a casing which comprises a metal sheet at least one practically plane portion of which has a part in contact with an electrode of one polarity, characterized in that this part of the sheet in contact with the said electrode is offset or depressed inwardly toward the inside of the cell in relation to the remainder of the said plane portion.

Preferably, the depressed or offset part is centrally located in said plane portion.

In an embodiment which provides an added advantage, the sheet is in the form of a cup whose practically plane inwardly offset portion is located at its bottom.

In this way, if an overpressure occurs inside the casing and the bottom of the cup tends to bend outwardly, that bending takes place in the central part of said inwardly offset portion while the rim or edges of the depressed or inwardly offset part remain in contact with the electrode. Moreover, since the bending occurs outwardly in the inwardly offset part, the general cell bulk (height) does not increase.

The invention will be better understood by means of the following examples, having no limiting character, described with reference to the accompanying drawing, in which:

FIG. 1 shows a sectional view of a cell cup according to the invention;

FIG. 2 shows a plan view of the cup in FIG. 1;

FIG. 3 shows a sectional view of a cell comprising a casing, one part of which is constituted by the cup of the preceding figures, and FIG. 4 shows a cutaway view of another cell comprising a casing different from that in FIG. 3 but also according to the invention.

DETAILED DESCRIPTION

FIGS. 1 and 2 show a metal sheet intended to form a part of the casing according to the invention and to which the form of a cup 1 is imparted. The bottom of that cup comprises an inwardly offset part 2 defining a peripheral edge 3 as is shown in FIG. 2.

FIG. 3 shows an electrochemical cell C according to the invention whose casing comprises on the one hand, a metal cup 11 similar to the cup 1, shown in FIGS. 1 and 2 and, on the other hand, a lid 17 made of plastic material, also in the form of a cup. The active portion of the cell is constituted by two interconnected negative electrodes 15 surrounding a positive electrode 14 from which they are separated by the separators 16 carrying imbibed electrolyte. As will be seen in FIG. 3, the metal cup 11 comprises, at its bottom, an inwardly offset part 12 which is in contact with one of the negative electrodes 15. The positive electrode 14 is electrically connected, for example, by welding to a metal member such as a rivet 18 traversing the lid 17 in a fluid-tight manner and constituting the positive terminal. The sealed closing of the casing C is effected by the crimping of the rim 19 of the cup 11 onto the bottom of the plastic lid 17. The assembly formed by the electrodes 14 and 15 and the separators 16 is tightly maintained between the inwardly offset part 12 and the inner surface of the lid 17. If an overpressure occurs inside the casing, for example, at the end of the charge in the case of a storage cell, the part 12 will bend outwardly, but its defining edges 13 will remain in contact with the negative electrode 15, thus transmitting current from the electrode 13 to casing 11. The swelling of the depressed or inwardly offset part 12 will not exceed the outer level of the remainder of the bottom of the cup 11. By way of an example, the extent of the offsetting may be of about the order of thickness of the metallic sheet, that is, a few tenths of a millimeter. The assembly of the cup 11 and plastic lid 17 whose structure is like that of the lid in said copending application may be effected in the manner described in said application.

FIG. 4 shows a cell C' of a further embodiment of a cell according to the invention. The casing is composed of a single metal part, one portion 21 of which is pressed into the shape of a cup 21 and a plane portion 27 folded back on to the outer surface of a peripheral rim 21'. The plane portion 27 acts as a lid and is welded to the cup on the peripheral rim which it overlaps. Such an arrangement is already known in the sealed storage cell techniques. It must be understood, too, that the cup 21 and the lid 27 could also be two distinct parts. The positive electrode 24 situated between two negative electrodes 25, from which it is separated by separators 28 containing electrolyte, is connected to a terminal member 28 which electrically insulated from the casing by a non-conductive washer or seal element 30 and an internal insulative protective sleeve-like member 29. The seal 30 and the protective member 29 also ensure the sealed closure of the hole of cup 11 through which a portion of the terminal 28 is connected to the positive electrode 24. The terminal 28 is screwed into a nut-like metal part 31 situated inside the protective sleeve-like member 29 which thus is insulated from the casing parts 21 and 27. Reference 34 designates an insulating tape or wrapping which prevents the positive electrode 24 from coming into contact with the cup 21.

As can be seen in FIG. 4, both the cup 21 and the lid 27 respectively comprise inwardly offset parts 22 and 32. These inwardly offset parts 22 and 32 are respectively in contact with the negative electrodes 25 and the compressive tightening together of the stacked electrode and separator components is ensured by the restricted distance afforded between these inwardly offset or depressed parts 22 and 32 in the assembled cell. If now an overpressure occurs inside the casing, the rim edges 23 and 33 of the inwardly offset parts 21 and 22 nevertheless will remain in contact with the negative electrodes even if parts 21 and 22 bow outwardly and said edges 23 and 33 will maintain both the electrical contact and the close compressed engagement of the electrodes and separators necessary for the proper operation of the cell.

It must be understood that the preceding details have been given only by way of an example and variations within the scope of the claims are possible and are contemplated. Thus, the metal sheet according to the invention need not necessarily have the shape of a cup (for instance the lid part 27 of FIG. 4 integral with cup part 21 does not have cup shape) and it could be a simple bottom or a simple lid with an inwardly offset portion forming a part of a casing made of plastic material, for example. There is no intention, therefore, of limitation to the exact disclosure hereinabove presented.

What is claimed is:

1. An electrochemical cell comprising a casing, electrolyte, a first electrode of one polarity, a second electrode and a third electrode both of like opposite polarity located respectively on each side of the first electrode, separator means between the electrodes and electrolyte within said casing, said casing comprising a metal sheet member having the shape of a shallow cup, a central part of the bottom of said casing being offset inwardly of said casing in relation to the remainder of said bottom and defining a peripheral rim in permanent contact with the said second electrode irrespective of outward deformation of said cell during use, and said cell also comprising a lid of insulating material over which the said member is crimped and terminal means connected to the first electrode sealingly mounted on said lid.

2. An electrochemical cell according to claim 1 wherein said second and third electrodes are negative electrodes and said first electrode is a positive electrode.

* * * * *